United States Patent [19]

Yamamoto et al.

[11] Patent Number: 5,519,751

[45] Date of Patent: May 21, 1996

[54] MEDICAL X-RAY IMAGE PROCESSING APPARATUS

[75] Inventors: Koei Yamamoto; Kazuhisa Miyaguchi, both of Shizuoka; Keisuke Mori, Kyoto; Akifumi Tachibana, Kyoto; Takao Makino, Kyoto, all of Japan

[73] Assignees: Hamamatsu Photonics K.K., Shizuoka; Kabushiki Kaisha Morita Seisakusho, Kyoto, both of Japan

[21] Appl. No.: 435,274

[22] Filed: May 5, 1995

Related U.S. Application Data

[63] Continuation of Ser. No. 124,610, Sep. 20, 1993, abandoned.

[30] Foreign Application Priority Data

Oct. 15, 1992 [JP] Japan ................................ 4-304733

[51] Int. Cl.⁶ ...................................................... A61B 6/14
[52] U.S. Cl. ............................................. 378/98.8; 378/38
[58] Field of Search ............................. 378/98.8, 38, 191

[56] References Cited

U.S. PATENT DOCUMENTS

| | | | |
|---|---|---|---|
| 4,593,400 | 6/1986 | Mouyen | 378/98.8 |
| 4,875,227 | 10/1989 | Rossi et al. | 378/98.4 |
| 5,434,418 | 7/1995 | Schick | 250/370.11 |

*Primary Examiner*—David P. Porta
*Assistant Examiner*—David Vernon Bruce
*Attorney, Agent, or Firm*—Koda and Androlia

[57] ABSTRACT

A medical X-ray image processing apparatus, comprising an X-ray sensor which converts an image of X-rays penetrated an object into an electric signal using a solid-state image sensor and a data processor which processes the electric signal to generate an electric image signal corresponding to the X-ray image, compares the data of each picture element derived from the above-mentioned solid-state image sensor with the data of picture elements being adjacent to the picture element and present within a certain region, and corrects the data of the picture element referring to the data of the above-mentioned adjacent picture elements only when the data of the picture element is exceptionally different from the data of the adjacent picture elements by a predetermined reference value or more. Consequently, the apparatus eliminates only the exceptionally large noise, such as spike noise caused by the X-rays having directly reached the solid-state image sensor and also caused by the secondary X-rays, thereby being capable of generating images having high resolution.

2 Claims, 3 Drawing Sheets

| 1<br>(4) | 2<br>(3) | 3<br>(2) |
|---|---|---|
| 3<br>(2) | 5 | 3<br>(2) |
| 2<br>(3) | 1<br>(4) | 1<br>(4) |

SINCE THE AVERAGE VALUE OF THE DATA FOR COMPARISON = 16/8 = 2, DATA FOR JUDGEMENT IS SET AT 2.

FIG. 3(a)

| 4<br>(2) | 2<br>(4) | 3<br>(3) |
|---|---|---|
| 3<br>(3) | 6 | 3<br>(3) |
| 2<br>(4) | 3<br>(3) | 5<br>(1) |

FIG. 3(b)

MEDICAL X-RAY IMAGE PROCESSING APPARATUS

This is a continuation of application Ser. No. 08/124,610, filed Sep. 20, 1993 now abandoned.

BACKGROUND OF THE INVENTION

1. Field of the Invention

The present invention relates to a medical X-ray image processing apparatus which converts an image of X-rays penetrated an object into an electric image signal and indicates the converted signal on a CRT display for example.

2. Description of the Prior Art

A widely used medical X-ray apparatus is a unit which converts an X-ray image into an electric image signal and indicates the converted signal on a CRT display for example, or prints the content of the signal using a printer or records the signal using a storage device as necessary. This kind of unit requires an X-ray sensor which converts an image of X-rays penetrated the affected portion (object) of a patient into an electric signal and a data processor which processes the electric signal to generate an electric image signal corresponding to the X-ray image. Such an X-ray sensor generally comprises a fluorescent substance which converts X-rays into visible light, a solid-state image sensor, such as a charge-coupled device, and a light conducting member, such as an optical fiber or optical lens, which conducts the visible light from the fluorescent substance to the solid-state image sensor. A variety of methods have been proposed to enhance the resolution of the image by improving the X-ray sensor (as disclosed by the U.S. Pat. Nos. 4,593,400 and 4,987,307 for example).

In the case of the above-mentioned X-ray sensor, all the X-rays are not converted into the visible light by the fluorescent substance, but several percent of the X-rays penetrate the fluorescent substance and directly reach the solid-state image sensor. When a charge-coupled device (hereafter referred to as "CCD") is used as a solid-state image sensor, its X-ray responding region has generally very low quantum efficiency at 10 KeV or more and its visible wavelength region is centered at about 550 nm. Since the device is responsive to both X-rays and visible light, the X-rays having directly reached the CCD affect the charges stored in the device. As a result, the obtained electric signal includes the information of the X-rays having directly reached the CCD and the information is superimposed as noise on the true image information derived from the visible light. Accordingly, the image formed by the image signal obtained by processing the electric signal of the CCD is dotted with noise spots in the image mostly based on the visible light information as if foreign matters were present in the affected portion of the patient, thereby reducing the resolution of the image and causing the problem of making diagnosis difficult.

To reduce the X-rays which cause the noise as few as possible, instead of arranging the fluorescent substance and the CCD on a straight line, conventional countermeasures have been taken; the CCD is dislocated by appropriately using an inclined optical fiber, reflector or optical lens, and an optical-fiber including X-ray absorbing material such as lead is used (as disclosed by the Japanese Patent Application Laid-open Publication No. 63-308592 and the U.S. Pat. No. 4,910,405 for example). However, if the CCD is dislocated, the entire size of the sensor must be made larger, thereby making it difficult to obtain a compact X-ray sensor capable of being accommodated in a restricted space in such a case wherein the sensor is used as a dental oral sensor to be inserted into the mouth of the patient for example. Furthermore, such a sensor which uses X-ray absorbing material to discriminate the X-rays and visible light cannot deliver sufficient discrimination performance when used in a restricted space in such a case wherein the sensor is used as an oral sensor.

Moreover, the X-rays being incident on the fluorescent substance always generate secondary X-rays, and the secondary X-rays generated in the shape of a tree by an avalanche effect penetrate the light conducting member and affect the charges stored in the CCD. Although the effect of the secondary X-rays can be reduced by increasing the thickness of the light conducting member, it is difficult to completely eliminate the effect. Besides, since the size of the light conducting member is limited, no desirable effect can be obtained.

SUMMARY OF THE INVENTION

In view of these problems of the prior art, the present invention provides an improved data processor. It is an object of the present invention to effectively eliminate X-ray components which cause noise, while preventing an X-ray sensor from being made larger. It is a further object of the present invention to provide a medical X-ray photographing apparatus capable of obtaining images superior in resolution by eliminating such noise components.

To achieve the above-mentioned objects, the medical X-ray image processing apparatus of the present invention, comprising an X-ray sensor which converts an image of X-rays penetrated an object into an electric signal using a solid-state image sensor and a data processor which processes the electric signal to generate an electric image signal corresponding to the X-ray image, compares the data of each picture element derived from the above-mentioned solid-state image sensor with the data of picture elements being adjacent to the picture element and present within a certain region, and corrects the data of the picture element referring to the data of the above-mentioned adjacent picture elements when the difference between the data of the picture element and the data of the adjacent picture elements for comparison is equal to or larger than a predetermined reference value.

The above-mentioned X-ray sensor can comprise a fluorescent member for converting X-rays into visible light, a CCD used as a solid-state image sensor and an optical fiber for conducting the visible light from the fluorescent member to the CCD for example. The sensor is used as a dental oral sensor to be inserted into the mouth of a patient for example.

As well known, the light-receiving surface of the CCD has about 250,000 minute picture elements for example arranged orderly in two dimensions. The X-rays which have directly reached the CCD without being converted into visible light by the fluorescent substance are incident on a part of the numerous picture elements. This phenomenon can be easily understood by thinking that the visible light and X-rays are regarded as photons and that the photons of the visible light are incident on the most picture elements and the photons of the X-rays are incident on a part of the picture elements.

The amount of charge of each picture element of the CCD generally corresponds to the energy of the photons being incident on the picture element and the conversion efficiency of the energy. However, since the sensitivity of the device to the X-ray photons is high, the amount of charge of a picture element on which the X-ray photons are incident is more than the amounts of charges of the surrounding picture elements on which the visible light is incident. For this reason, the data of the amount of charge of the picture element on which the X-ray photons are incident is exceptionally larger than the amounts of charges of the surrounding picture elements. All the differences obtained by subtracting the amounts of charges of the surrounding picture elements from the data of the amount of charge of the picture element on which the X-ray photons are incident are positive values. However, since it is usual that such discontinuously exceptional data does not appear in the natural world, if the difference is equal to or larger than a predetermined reference value, the data processor judges that the data is unusual and corrects the data of the picture element referring to the data of the surrounding picture elements, thereby eliminating the exceptional data. Although the above-mentioned explanation applies to a case wherein the data of the picture element is larger than the data of the surrounding picture elements, the explanation is also applicable correspondingly to a case wherein the data of the picture element is smaller than the data of the surrounding picture elements when an inverted signal is used for example.

BRIEF DESCRIPTION OF THE DRAWINGS

FIG. 3(a) is an explanatory figure illustrating a subtraction process conducted by the embodiment; and FIG. 3(b) is also an explanatory figure illustrating another subtraction process conducted by the embodiment.

DETAILED DESCRIPTION OF THE PREFERRED EMBODIMENTS

Figure 1:
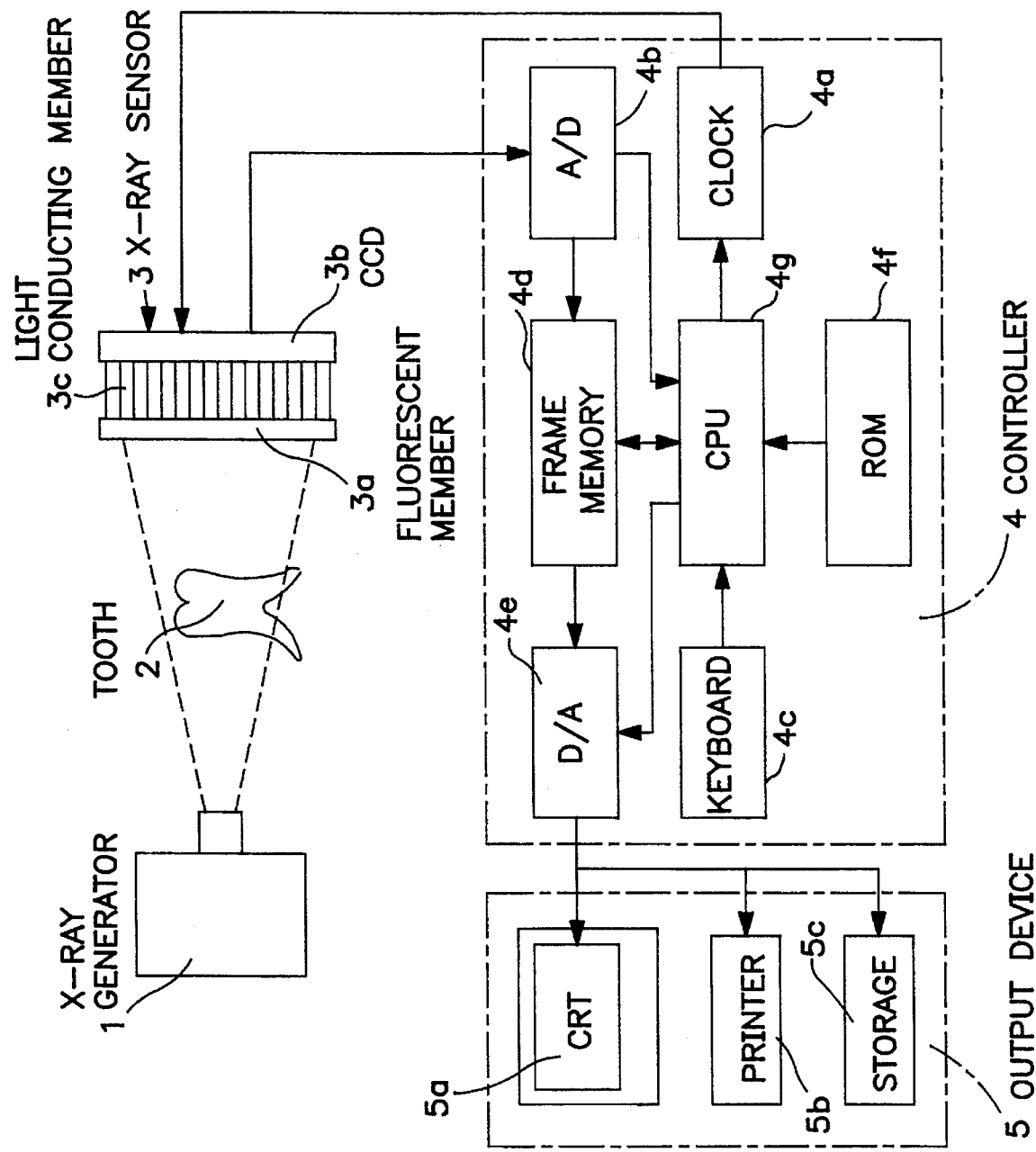
FIG. 1 is a block diagram illustrating the entire structure of an embodiment of the apparatus of the present invention.

An embodiment of the apparatus of the present invention is explained below by taking a dental X-ray apparatus as an example. FIG. 1 is a block diagram illustrating the entire structure of the apparatus. Referring to FIG. 1, numeral 1 represents an X-ray generator, numeral 2 represents a tooth (object) of a patient, numeral 3 represents an X-ray sensor, numeral 4 represents a controller and numeral 5 represents an output device. The X-ray sensor 3 comprises a fluorescent member 3a which converts X-rays into visible light, a CCD 3b which converts the visible light image generated on the fluorescent member 3a into an electric signal corresponding to the visible light image, and a light conducting member 3c consisting of a bundle of optical fibers arranged vertically to the CCD 3b to conduct the visible light from the fluorescent member 3a to the CCD 3b. The controller 4 processes the electric signal of the CCD 3b to obtain an electric image signal corresponding to the X-ray image of the tooth 2. To accomplish this object, the controller 4 comprises a horizontal/vertical sweep signal generation circuit 4a, an A/D conversion input section 4b, a keyboard 4c, a frame memory 4d, a D/A conversion output section 4e, a ROM 4f which stores signal processing programs and a CPU 4g which controls the operations of the entire apparatus. In addition, the output device 5 comprises a CRT display 5a, a printer 5b and an external storage device 5c, such as a tape or disk drive unit.

With the above-mentioned structure, the X-ray generator 1 is positioned outside the mouth of the patient, the X-ray sensor 3 is inserted into the mouth and positioned behind the tooth 2 to be diagnosed. When irradiated, the X-rays penetrate the tooth 2, strike the fluorescent member 3a of the X-ray sensor 3 and are converted into visible light. Consequently, a visible light image having a light intensity corresponding to the image of the X-rays is incident on the CCD 3b. As a result, a charge distribution corresponding to the light intensity of the visible light image is generated at the CCD 3b. The amount of charge of each picture element is then called as an electric signal sequentially in accordance with the arrangement of the picture elements, converted into a digital amount, and temporarily stored in the frame memory 4d.

Figure 2:
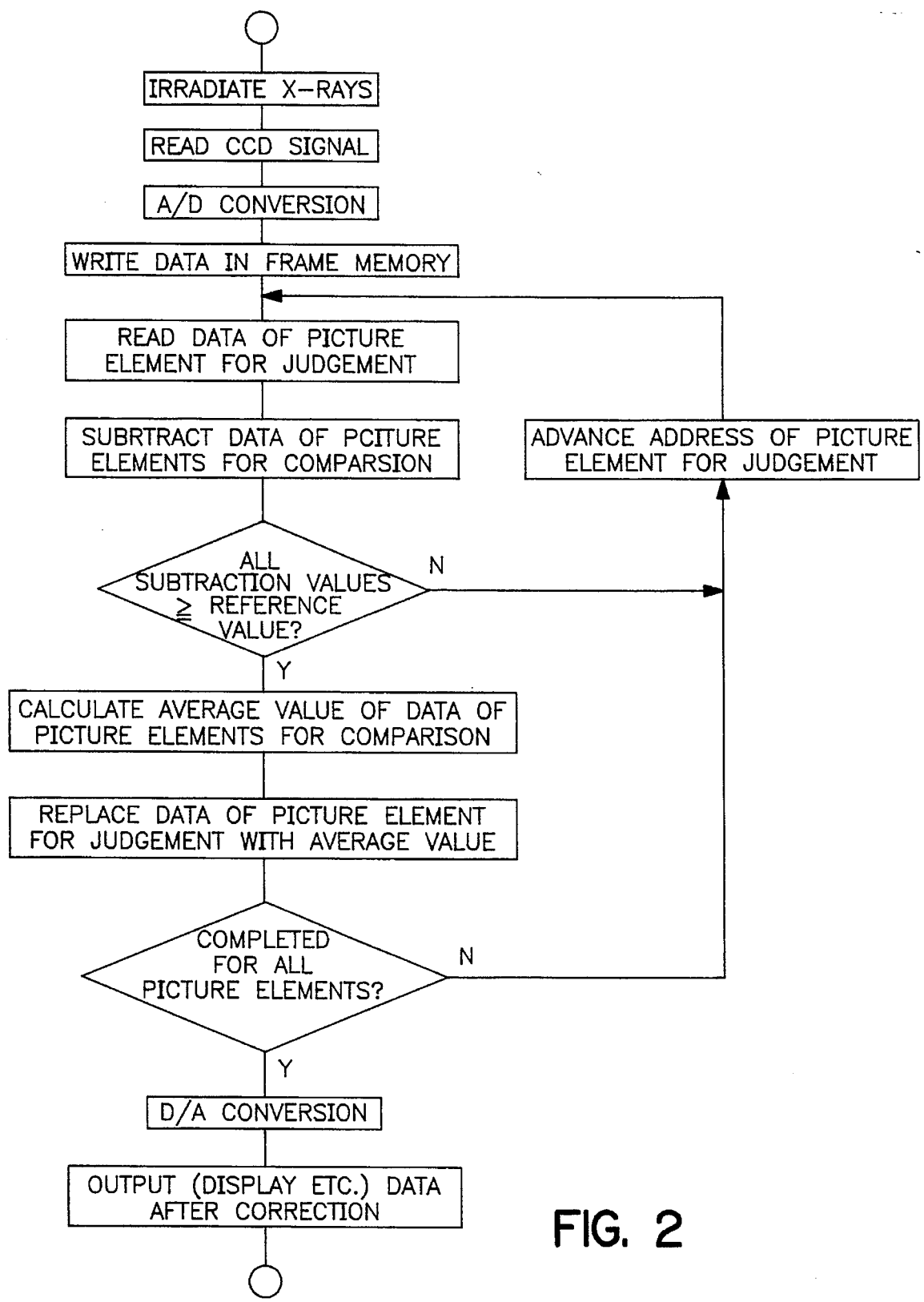
FIG. 2 is a flow chart illustrating the processing procedure conducted by the embodiment.

Next, the data of each picture element stored in the frame memory 4d is taken in by the CPU 4g as data for judgment. The data is compared in magnitude by subtraction with data for comparison, that is, the data of the surrounding picture elements within a certain region. If all the obtained subtraction values are equal to or larger than a predetermined reference value, the average value of the data for comparison is calculated and the data for judgment is replaced with this average value and used for correction. This operation is sequentially executed for all picture elements. After all the picture elements are processed, the output device 5 is activated to indicate the results on the CRT display 5a. When necessary, the results are output by the printer 5b in hard copy form, or stored by the external storage device 5c for future use. FIG. 2 is a flow chart illustrating the above-mentioned procedure.

The above-mentioned procedure eliminates discontinuously exceptional data after comparison with the data of the surrounding picture elements. For this reason, even when the X-ray sensor 3, which is compact and capable of being accommodated in a restricted space such as a mouth, is used, the obtained image is clear and has less noise and higher resolution. In this way, an X-ray photographing apparatus suited for dental diagnosis and treatment can be obtained.

The present invention is not only applicable to dental diagnosis and treatment apparatuses as described in the above-mentioned embodiment, but also applicable to a variety of X-ray photographing apparatuses. In particular, the apparatus of the present invention is ideally suited for diagnosing relatively small regions by using X-ray images. In addition, by simply modifying the data processing procedure of the apparatus, various measures can be taken in accordance with the requirements of applications and portions to be photographed without changing the hardware of the apparatus.

Moreover, the X-ray sensor is not limited to the structure of the embodiment, wherein the visible light of the fluorescent member is conducted to the CCD by the optical fiber, but other types of sensors can also be used.

In the above-mentioned procedure, eight picture elements in total are selected as the adjacent picture elements for comparison, i.e., upper, lower, left, right and four obliquely located picture elements, for example. FIGS. 3(a) and 3(b) are explanatory figures illustrating the subtraction processes. The value at the center is the data for judgment and the surrounding values are data for comparison. The values in the parentheses are values obtained by subtraction. In FIG. 3(a), all the values obtained by subtraction is 2 or more. In FIG. 3(b), one of the values obtained by subtraction is 1. If the reference value is 2, all the values obtained by subtraction are +2 or more in the case of FIG. 3(a) and this is judged as unusual. The data for judgment (=5) is corrected to the average value ($16/8=2$) of the data for comparison. In this way, discontinuously exceptional data in comparison with the surrounding data is eliminated. In FIG. 3(b), the difference between the data for judgment and the value at the bottom right is 1, that is, less than the reference value. In this case, the data for judgment is not corrected on the basis of the judgment that there is continuity between the data for judgment and the data for comparison. The correction is also performed when all the values obtained by subtraction are −2 or less. However, if the values obtained by subtraction include positive and negative values, no correction is performed.

In the above-mentioned example, the data of a single picture element is compared with the data of the eight picture elements surrounding the single picture element. However, four picture elements located at the upper, lower, left and right positions for example surrounding the single picture element can also be used as the picture elements for comparison, or a plurality of continuous picture elements can be used as picture elements for judgment and can be compared with a plurality of the surrounding picture elements in the way similar to that described above. In this way, the picture element for judgment and the picture elements for comparison can be selected as desired. Furthermore, the reference value can also be selected as desired. Accordingly, the combination of the picture elements and the reference value can be selected as desired depending on the property of the image of an object to be photographed and the image resolution to be required. Moreover, instead of simply using the average value obtained by subtraction as described in the correction procedure of the embodiment, an average value can be calculated after each value obtained by subtraction is weighted. Besides, the region of the picture elements for comparison can be extended by setting the reference value at two steps. Accordingly, a variety of applications are possible.

The method of comparing the data of the picture element for judgment with the data of the surrounding picture elements for comparison and correcting the data for judgment in order to eliminate the adverse effect of the noise caused by the X-rays having directly reached the CCD has already been known as the median filter method. With this conventional method, however, only when the data of the picture element for judgment does not coincide with the average value of the data of the picture elements for comparison, the data of the picture element for judgment is corrected to the average value. For this reason, the method makes corrections when the data of the picture element for judgment is exceptional in comparison with the data of the picture elements for comparison as a matter of course, but the method also makes corrections unconditionally even when there is no discontinuity. The method, therefore, has a disadvantage of generating images entirely blurred and thus low in resolution.

Contrary to the method, the procedure used for the apparatus of the present invention refers to the data of the adjacent picture elements and corrects the data of the picture for judgment only when the data of the picture element for judgment is exceptionally different from the data of the adjacent picture elements by the amount of the reference value or more. For this reason, the procedure of the present invention eliminates only the exceptionally large noise, such as spike noise caused by the X-rays having directly reached the solid-state image sensor, such as a CCD, without being converted into visible light by the fluorescent substance, and also caused by the secondary X-rays, thereby generating images having high resolution and allowing X-ray apparatuses suited for dental diagnosis and other purposes to be provided easily.

What is claimed is:

1. A medical X-ray image processing apparatus comprising an X-ray sensor which converts an image of X-rays penetrated an object into an electric signal using a solid-state image sensor and a data processor which processes the electric signal to generate an electric image signal corresponding to the X-ray image, being characterized in that said data processor compares data of each picture element derived from said solid-state image sensor with data of each picture element adjacent to the each picture element and present within a certain region, and corrects the data of the each picture element when the difference between the data of the each picture element and the data of each of the adjacent picture elements is equal or larger than a predetermined reference value.

2. A medical X-ray image processing apparatus as claimed in claim 1, wherein said X-ray sensor comprises a fluorescent member for converting X-rays into visible light, a charge-coupled device for converting the visible light into an electric signal, and an optical fiber for conducting the visible light from said fluorescent member to said charge-coupled device.

* * * * *